US011355335B2

(12) United States Patent
Park

(10) Patent No.: US 11,355,335 B2
(45) Date of Patent: Jun. 7, 2022

(54) MASS SPECTROMETRIC SYSTEM WITH ION MOBILITY ANALYZER AT ELEVATED PRESSURE

(71) Applicant: Bruker Scientific LLC, Billerica, MA (US)

(72) Inventor: Melvin Andrew Park, Billerica, MA (US)

(*) Notice: Subject to any disclaimer, the term of this patent is extended or adjusted under 35 U.S.C. 154(b) by 0 days.

(21) Appl. No.: 16/884,626

(22) Filed: May 27, 2020

(65) Prior Publication Data

US 2020/0381240 A1 Dec. 3, 2020

Related U.S. Application Data

(60) Provisional application No. 62/855,106, filed on May 31, 2019.

(51) Int. Cl.
*H01J 49/00* (2006.01)
*H01J 49/24* (2006.01)
*G01N 27/622* (2021.01)
*H01J 49/06* (2006.01)
*H01J 49/16* (2006.01)
*H01J 49/42* (2006.01)

(52) U.S. Cl.
CPC ............ *H01J 49/24* (2013.01); *G01N 27/622* (2013.01); *H01J 49/0031* (2013.01); *H01J 49/0045* (2013.01); *H01J 49/061* (2013.01); *H01J 49/165* (2013.01); *H01J 49/4225* (2013.01)

(58) Field of Classification Search
CPC ........ H01J 49/00; H01J 49/02; H01J 49/0027; H01J 49/0031; H01J 49/004; H01J 49/0045; H01J 49/06; H01J 49/061; H01J 49/062; H01J 49/066; H01J 49/26; H01J 49/426; H01J 49/4295; G01N 27/622
USPC ......................... 250/281, 282, 283, 286, 290
See application file for complete search history.

(56) References Cited

U.S. PATENT DOCUMENTS

| | | | |
|---|---|---|---|
| 6,630,662 B1 | 10/2003 | Loboda | |
| 7,838,826 B1 | 11/2010 | Park | |
| 8,766,176 B2 | 7/2014 | Park et al. | |
| 9,683,964 B2 | 6/2017 | Park | |
| 10,241,079 B2 | 3/2019 | Betz et al. | |
| 2004/0195503 A1 | 10/2004 | Kim et al. | |

(Continued)

FOREIGN PATENT DOCUMENTS

| | | |
|---|---|---|
| EP | 3531122 A1 | 8/2019 |
| WO | 2012148836 A | 11/2012 |

OTHER PUBLICATIONS

Kirk, Samuel R. et al. "On the Preservation of Non-covalent Peptide Assemblies in a Tandem-Trapped Ion Mobility Spectrometer-Mass Spectrometer (TIMS-TIMS-MS)", Journal of American Society for Mass Spectrometry, 2019, 30:1204-1212.

(Continued)

*Primary Examiner* — Jason L Mccormack
(74) *Attorney, Agent, or Firm* — Benoit & Côté Inc.

(57) ABSTRACT

The invention provides hybrid mass spectrometric systems which comprise an ion source, a first trapped ion mobility spectrometry (TIMS) analyzer and a mass analyzer, wherein the TIMS analyzer is located and operated in a first vacuum chamber at an elevated pressure above 500 Pa, and methods for operating the hybrid mass spectrometric systems.

32 Claims, 8 Drawing Sheets

(56) References Cited

U.S. PATENT DOCUMENTS

| | | | |
|---|---|---|---|
| 2006/0273251 A1* | 12/2006 | Verbeck | H01J 49/0013 |
| | | | 250/281 |
| 2009/0057551 A1* | 3/2009 | Tang | H01J 49/165 |
| | | | 250/288 |
| 2009/0242755 A1* | 10/2009 | Tang | H01J 49/066 |
| | | | 250/288 |
| 2016/0351382 A1* | 12/2016 | Giles | H01J 49/005 |
| 2017/0131238 A1* | 5/2017 | Giles | G01N 27/622 |
| 2017/0212081 A1* | 7/2017 | Green | G01N 27/62 |
| 2017/0350860 A1 | 12/2017 | Räther et al. | |
| 2018/0038831 A1* | 2/2018 | Ibrahim | G01N 27/622 |
| 2018/0340910 A1* | 11/2018 | Betz | G01N 27/622 |
| 2019/0057852 A1* | 2/2019 | Ibrahim | H01J 49/062 |
| 2020/0182829 A1* | 6/2020 | Larriba-Andaluz | |
| | | | G01N 27/622 |

OTHER PUBLICATIONS

Dit Fouque, Kevin Jeanne et al. "Recent advances in biological separations using trapped ion mobility spectrometry—mass spectrometry", Trends in Analytical Chemistry 116, 2019, 308-315.

Ridgeway Mark, et al. "Trends in trapped ion mobility—Mass spectrometry instrumentation", Trends in Analytical Chemistry 116, 324-331.

Liu, Fanny C., et al. "Tandem trapped ion mobility spectrometry", The Royal Society of Chemistry, 2013.

Michelmann, Karsten et al., "Fundamentals of Trapped Ion Mobility Spectrometry", J. Am. Soc. Mass Spectrom., 2015, 26, 14-24.

\* cited by examiner

MASS SPECTROMETRIC SYSTEM WITH ION MOBILITY ANALYZER AT ELEVATED PRESSURE

BACKGROUND OF THE INVENTION

Field of the Invention

The invention relates to hybrid mass spectrometric systems in which trapped ion mobility spectrometry (TIMS) is coupled with mass spectrometry (MS), in particular tandem mass spectrometry (tandem MS), and methods for operating the hybrid mass spectrometric systems.

Description of the Related Art

Ion mobility spectrometry (IMS) is an analytical technique that is used to investigate the mobility of ions in a buffer gas and to separate them according to their mobility.

An inherent feature of ion mobility spectrometry is that the mobility of ions in a buffer gas depends on molecular geometries of the ions such that it is often possible to resolve and thus separate isomers or conformers that cannot be resolved by mass spectrometry. Many applications also take advantage of the ability to determine the cross section of an analyte ion from its measured mobility. Knowledge of cross sections has proven to be significant in many areas including identifying compound class and detailed structure, in particular in the field of structural biology.

In trapped ion mobility spectrometry (TIMS), ions are at first trapped along a non-uniform electric DC field (electric field gradient, EFG) by a counteracting gas flow or along a uniform electric DC field by a counteracting gas flow which has a non-uniform axial velocity profile (gas velocity gradient). The trapped ions are at first separated in space in a TIMS analyzer according to mobility and subsequently eluted from the TIMS analyzer over time according to their mobility by adjusting one of the gas velocity and the height of axial electric DC field (U.S. Pat. No. 6,630,662 B1 by Loboda; U.S. Pat. No. 7,838,826 B1 by Park). A TIMS analyzer is operated in the low pressure range of 2 to 500 Pa and uses an electric RF field for radially confining the ions. Regarding the theoretical basis of TIMS, see the article "Fundamentals of Trapped Ion Mobility Spectrometry" by Michelmann et al. (J. Am. Soc. Mass Spectrom., 2015, 26, 14-24).

U.S. Pat. No. 9,683,964 (Park et. al) teaches a TIMS analyzer comprising a trapping region and a separating region for parallel accumulation. The TIMS analyzer accumulates ions in the trapping region while pre-accumulated ions are analyzed in the separating region parallel in time. A gas flow drives ions against a ramp of a counteracting electric DC field barrier of the trapping region such that the ions are axially trapped and get separated according to their mobility at locations along the ramp. During the accumulation of ions in the trapping region, the gas flow also drives ions, which have been accumulated in a prior accumulation and transferred to the separating region, against a ramp of a counteracting electric DC field barrier of the separating region such that the ions get axially trapped and spatially separated according to their mobility. After loading the separating region with accumulated ions to be analyzed, the height of the counteracting electric DC field barrier is steadily decreased such that ion species are released from the separating region in the sequence of their mobility.

Published U.S. Patent Application 2017/0350860 (Raether et al.) teaches that the radially confining electric RF field of a TIMS analyzer can at least partly be an hexapolar, octopolar or higher order electric RF field.

U.S. Pat. No. 10,241,079 (Betz et. al) teaches a system comprising two TIMS analyzers with an ion gate between both TIMS analyzers. The ion gate is used to select one or more ion species after being separated in the upstream TIMS analyzer for a selective transfer to the downstream TIMS analyzer. Transient electric potentials are applied to the electrodes of the ion gate such that the transmission for ions in at least one limited mobility range is reduced, preferably such that unwanted ions are eliminated or at least substantially reduced and that the transmission for highly abundant ion species of interest is lower than the transmission of less abundant ion species of interest.

There is still a need for hybrid mass spectrometric systems with one or more TIMS analyzers which can handle higher ion currents from the ion sources in order to lower the limit of detection for low abundant ion species.

SUMMARY OF THE INVENTION

In a first aspect, the invention provides a mass spectrometric system comprising an ion source, a first trapped ion mobility spectrometry (TIMS) analyzer and a mass analyzer, wherein the TIMS analyzer is located and operated in a first vacuum chamber at an elevated pressure above 500 Pa. The elevated pressure can be equal or above 1000 Pa, 1500 Pa, 2000 Pa, 3000 Pa, 5000 Pa or 10000 Pa.

The TIMS analyzer can comprise an electric DC field gradient (ramp) and a counteracting gas flow that drives ions against the electric DC field gradient such that ions are axially trapped in the RF ion guide. The direction of the gas flow can be directed upstream towards an ion source or downstream away from the ion source. Most preferably, the electric DC field gradient is the rising edge of an electric DC field barrier having an apex or a plateau whereas the counteracting gas flow drives the ions away from the ion source against the barrier. The TIMS analyzer can also comprise a gas flow with a velocity gradient and a counteraction (constant) electric DC field. The ions are radially confined by an electric RF field. The trapped ions are axially released from the ion guide according to their mobility by adjusting the electric DC field and/or the gas flow.

The mass spectrometric system can further comprise a second TIMS analyzer wherein the second TIMS analyzer is located downstream of the first TIMS analyzer. The second TIMS analyzer can either be located also in the first vacuum chamber or in a second vacuum chamber. The pressure in the second vacuum chamber is preferably lower than the pressure in the first vacuum chamber, e.g. below 500 Pa, preferably between 100 Pa and 300 Pa. However, the pressure in the second vacuum chamber can also be equal to or higher than the pressure in the first vacuum chamber.

The mass spectrometric system can further comprise an ion gate between both TIMS analyzers which is preferably located at or near the exit of the first TIMS analyzer. The ion gate can be used to select one or more ion species after being separated in the first TIMS analyzer for a selective transfer to the second TIMS analyzer as described in U.S. Pat. No. 10,241,079 (Betz et. al) or for tandem IMS. For a selective transfer, the ion gate can be operated by adjusting the transmission of the ion gate such that the transmission for ions in at least one limited mobility range is reduced, preferably such that unwanted ion species are eliminated or at least substantially reduced and that the transmission for highly abundant ion species of interest is lower than the transmission of less abundant ion species of interest.

At least one or both TIMS analyzers preferably comprise an accumulation region for trapping and a mobility separation region. A TIMS analyzer (separator) with parallel accumulation is disclosed in U.S. Pat. No. 9,683,964 (Park et. al).

The first TIMS analyzer can be arranged collinearly to the second TIMS analyzer. More preferably, the first TIMS analyzer is arranged non-collinearly to the second TIMS analyzer. The non-collinear arrangement means that the angle between the axis of the first TIMS analyzer and the axis of the second TIMS analyzer is substantially not zero. The angle between the axis of the first TIMS analyzer and the axis of the second TIMS analyzer is greater than 10°, preferably greater than 45°, more preferably greater than 75°, in particular substantially 90° (orthogonal arrangement). The angle between the axis of the first TIMS analyzer and the axis of the second TIMS analyzer can be more than 90°, e.g. more than 90° and less than 120°. The first and/or second TIMS analyzer can comprise an RF funnel at the entrance. In the non-collinear case, the second TIMS analyzer preferably comprises an RF funnel at its entrance.

The mass spectrometric system can further comprise an RF multipole located between the first and second TIMS analyzer. The RF multipole can be collinearly arranged to the first TIMS analyzer or tilted to the first TIMS analyzer, e.g. by an angle of less than 20°. The RF multipole is most preferably linear (two-dimensional) and can be straight or bent. The RF multipole is preferably located between the ion gate and the second TIMS analyzer, and can for example be one of an RF quadrupole, an RF hexapole, an RF octopole and an RF ion tunnel. The RF multipole can be operated as one of a mass filter, a mobility-mass filter, an ion guide, a fragmentation cell, an activation cell and an ion trap. The RF multipole can be completely located in the first or second vacuum chamber or can transition from the first into the second vacuum chamber. The RF multipole can also be located in an additional vacuum chamber which is located between the first and second vacuum chamber and separated from these vacuum chambers by differential pumping stages wherein the pressure in the additional vacuum chamber is preferably lower than the pressure in the first and second vacuum chamber.

The mass spectrometric system can comprise more than one ion source. One of the ion sources can be an atmospheric pressure ion source which is coupled to the first vacuum chamber by one of a single transfer capillary, multiple transfer capillaries, a multibore transfer capillary, a single aperture and multiple apertures. One of the ion sources can be a sub-ambient pressure ion source which can, for example, be located upstream of the first TIMS analyzer or between the first TIMS analyzer and the second TIMS analyzer. The ions can be generated using one of spray ionization (e.g. electrospray (ESI) or thermal spray), desorption ionization (e.g. matrix-assisted laser/desorption ionization (MALDI) or secondary ionization), chemical ionization (CI), photo-ionization (PI), electron impact ionization (EI), and gas-discharge ionization.

The mass analyzer is one of a time-of-flight analyzer, in particular with orthogonal ion injection, an electrostatic ion trap, an RF ion trap, an ion cyclotron frequency ion trap and a quadrupole mass filter. The mass spectrometric system can further comprise a mass filter and/or a fragmentation cell between the ion mobility analyzer and the mass analyzer. The ions can be fragmented by one of collision induced dissociation (CID), surface induced dissociation (SID), photo-dissociation (PD), electron capture dissociation (ECD), electron transfer dissociation (ETD), collisional activation after electron transfer dissociation (ETcD), activation concurrent with electron transfer dissociation (AI-ETD) and fragmentation by reactions with highly excited or radical neutral particles. The photo-dissociation preferably comprises infrared multiple photon-dissociation (IRMPD) or ultraviolet photo-dissociation (UVPD). The selected ions can be activated for example by multiple photon absorption or by collision induced activation in dipolar or rotational acting electric AC fields.

In a second aspect, the invention provides a method for analyzing ions, comprising the steps: providing ions from an ion source to a first TIMS analyzer; separating the ions according to mobility in the first TIMS analyzer at an elevated pressure above 500 Pa; selecting at least one ion species of interest; transferring the selected ions of interest to a trapping region of a second TIMS analyzer; separating the selected ions of interest according to mobility in the second TIMS analyzer; and analyzing the separated ions by mass spectrometry or tandem mass spectrometry. The ion current provided from the ion source to the first TIMS analyzer is lower than the ion current of the selected ions of interest transferred to the second TIMS analyzer. The elevated pressure can be equal to, or above, 1000 Pa, 1500 Pa, 2000 Pa, 3000 Pa, 5000 Pa or 10000 Pa.

The step of selecting at least one ion species of interest preferably comprises that the transmission of ions to the second TIMS analyzer is reduced for ions in at least one limited mobility range, preferably such that unwanted ion species are eliminated or at least substantially reduced, more preferably such that the transmission for highly abundant ion species of interest is lower than the transmission of less abundant ion species of interest. The selected ions can, for example, be from a single limited mobility range or from multiple disjointed mobility ranges.

Preferably, the selected ions of interest are separated in the second TIMS analyzer at a pressure below 500 Pa, preferably between 100 Pa and 300 Pa. However, the selected ions of interest can also be separated in the second TIMS analyzer also at an elevated pressure equal to, or above, 500 Pa, 1000 Pa, 1500 Pa, 2000 Pa, 3000 Pa, 5000 Pa or 10000 Pa.

Preferably, the steps of separating in the first TIMS analyzer and selecting are repeated and the transferred ions of interest are accumulated in the trapping region of the second TIMS analyzer prior to separating them in the second TIMS analyzer. More preferably, the selected ions of interest are separated in the second TIMS analyzer at a pressure below 500 Pa, preferably between 100 Pa and 300 Pa and the repetition rate of separations in the first TIMS analyzer can be a factor of 2, 5, 10, 20 or 50 higher than the repetition rate of separations in the second TIMS analyzer. Due to operating the first TIMS analyzer at elevated pressure, the average mobility resolution of the first TIMS analyzer can be substantially equal to the average mobility resolution of the second TIMS, albeit at a much higher repetition rate and thus ion throughput. Alternatively, the average mobility resolution of the first TIMS analyzer can be higher than the average mobility resolution of the second TIMS at the same repetition rate. In the case that both TIMS analyzers are operated at elevated pressure, the first TIMS analyzer can be operated at higher repetition rate (e.g. by more than a factor of 2, 5, 10, 20 or 50) and lower resolution, while selected ions with a reduced amount of charge are analyzed in the second TIMS analyzer, which is operated at a lower repetition rate and higher mobility resolution, in particular at a mobility resolution at or above 500.

The selected ions of interest can further be filtered according to their mass or to a combination of their mass and mobility prior to being trapped in the trapping region of the second TIMS analyzer.

In a third aspect, the invention provides a method for analyzing ions, comprising the steps: providing ions from an ion source to a first TIMS analyzer; separating the ions according to mobility in the first TIMS analyzer at an elevated pressure above 500 Pa; selecting one ion species of interest from a limited mobility range; fragmenting or activating the selected ions of interest; transferring the fragment ions or activated ions to a trapping region of a second TIMS analyzer; separating the fragment ions or activated ions according to mobility in the second TIMS analyzer; and analyzing the separated ions by mass spectrometry or tandem mass spectrometry. The elevated pressure can be equal to or above 1000 Pa, 1500 Pa, 2000 Pa, 3000 Pa, 5000 Pa or 10000 Pa.

Preferably, the selected ions of interest are separated in the second TIMS analyzer at a pressure below 500 Pa, preferably between 100 Pa and 300 Pa. However, the selected ions of interest can also be separated in the second TIMS analyzer at an elevated pressure equal to, or above, 500 Pa, 1000 Pa, 1500 Pa, 2000 Pa, 3000 Pa, 5000 Pa or 10000 Pa.

Preferably, the steps of separating in the first TIMS analyzer, selecting, and fragmenting or activating are repeated, and the transferred fragment ions or activated ions are accumulated in the trapping region of the second TIMS analyzer prior to separating them in the second TIMS analyzer. More preferably, the repetition rate of separations in the first TIMS analyzer is a factor of 2, 5, 10, 20 or 50 higher than the repetition rate of separations in the second TIMS analyzer. The average mobility resolution of the first TIMS analyzer can be substantially equal to, or higher than, the average mobility resolution of the second TIMS.

The selected ions of interest can further be filtered according to their mass or to a combination of their mass and mobility prior to being trapped in the trapping region of the second TIMS analyzer.

The temporal zoom mode of TIMS analyzers is described in U.S. Pat. No. 8,766,176 (Park et al.) and comprises adjusting the electric DC field and/or the gas flow at a high scan speed outside mobility ranges of interest and lowering the scan speed in mobility ranges of interest to achieve a high momentary ion mobility resolution. The temporal zoom mode can be used during the separation in the first TIMS analyzer in order to increase the selectivity of the selection step in that the scan rate of the first TIMS analyzer is momentarily reduced for ion species of interest. The mobility resolution of the first TIMS analyzer for the ion species of interest is increased compared to the average mobility resolution of the first TIMS analyzer.

It is surprising that a TIMS analyzer according to the present invention can handle higher ion current from the ion sources because, according to common knowledge, an operation at elevated pressure reduces the RF pseudo-potential which is necessary to confine ions along the axis of the TIMS analyzer without getting lost by de-charging. Reducing the RF pseudo-potential results in a reduced charge capacity, i.e. that fewer ions can be trapped in the TIMS analyzer, and that a reduced ion current can be handled. It is an insight of the present invention that the effect of an elevated pressure on the RF pseudo-potential is compensated and even over-compensated for following reasons:

First, the elevated pressure shifts the operating point of the TIMS analyzer away from the minimum of the Paschen curve and allows higher electric RF voltages to be applied to the electrodes of the TIMS analyzer without arcing such that the RF pseudo-potential is strengthened.

Second, the elevated pressure also shifts the stability regions of ion motion such that higher RF voltages can be applied to the electrodes of the TIMS analyzer without getting unstable ion trajectories.

Third, the mobility resolution of a TIMS analyzer approximately scales by $K^{-3/4}$ and therefore by $p^{3/4}$ wherein K is the mobility of the ions and p is the pressure. The average mobility resolution is approximately proportional to $(f_{TIMS})^{-1/4}$ wherein $f_{TIMS}$ is the repetition rate of separations, i.e. that a TIMS analyzer at an elevated pressure can be operated at a higher repetition rate without giving up mobility resolution and thus selectivity in the selection step. A higher repetition rate is advantageous because it reduces the accumulation of charge in the TIMS analyzer, i.e. the amount of charge per analysis. Furthermore, selecting ion species of interest causes the ion current transferred to a downstream TIMS analyzer to be smaller than the ion current into the first TIMS analyzer, i.e. that the amount of charge in the second TIMS analyzer is reduced. The step of selecting preferably comprises substantially eliminating ion species that are not of interest, and reducing highly abundant ion species of interest compared to less abundant ion species of interest.

The operation of a TIMS analyzer at elevated pressure enables selecting ion species of interest at an increased repetition rate without reducing selectivity compared to an operation at lower pressure. In total, a much higher ion current from the ion sources can be analyzed using a TIMS analyzer at elevated pressure which leads to a lower limit of detection.

with two TIMS analyzers, a mass filter (403), a fragmentation cell (404) and a mass analyzer (405).

Figure 4A:
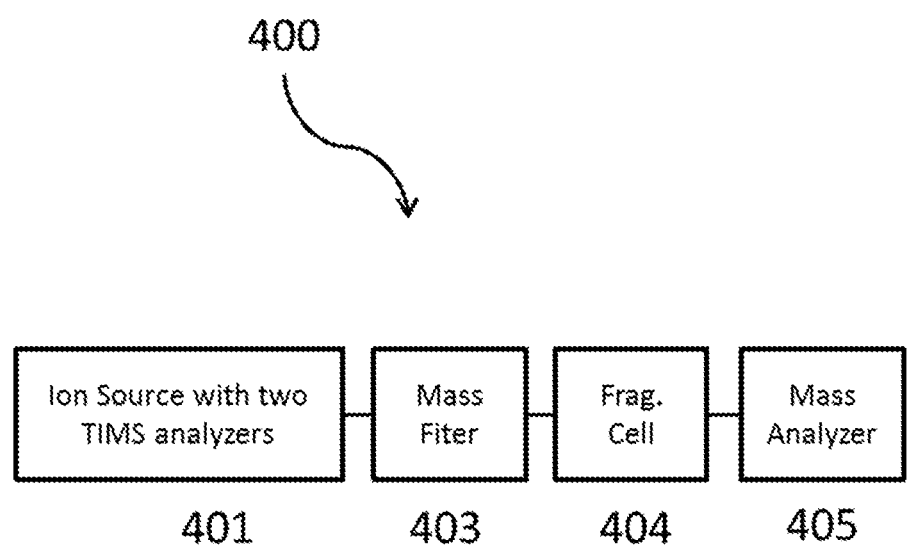
FIG. 4A shows a schematic of a fourth exemplary mass spectrometric system (400) comprising an ion source (401)
Figure 4B:
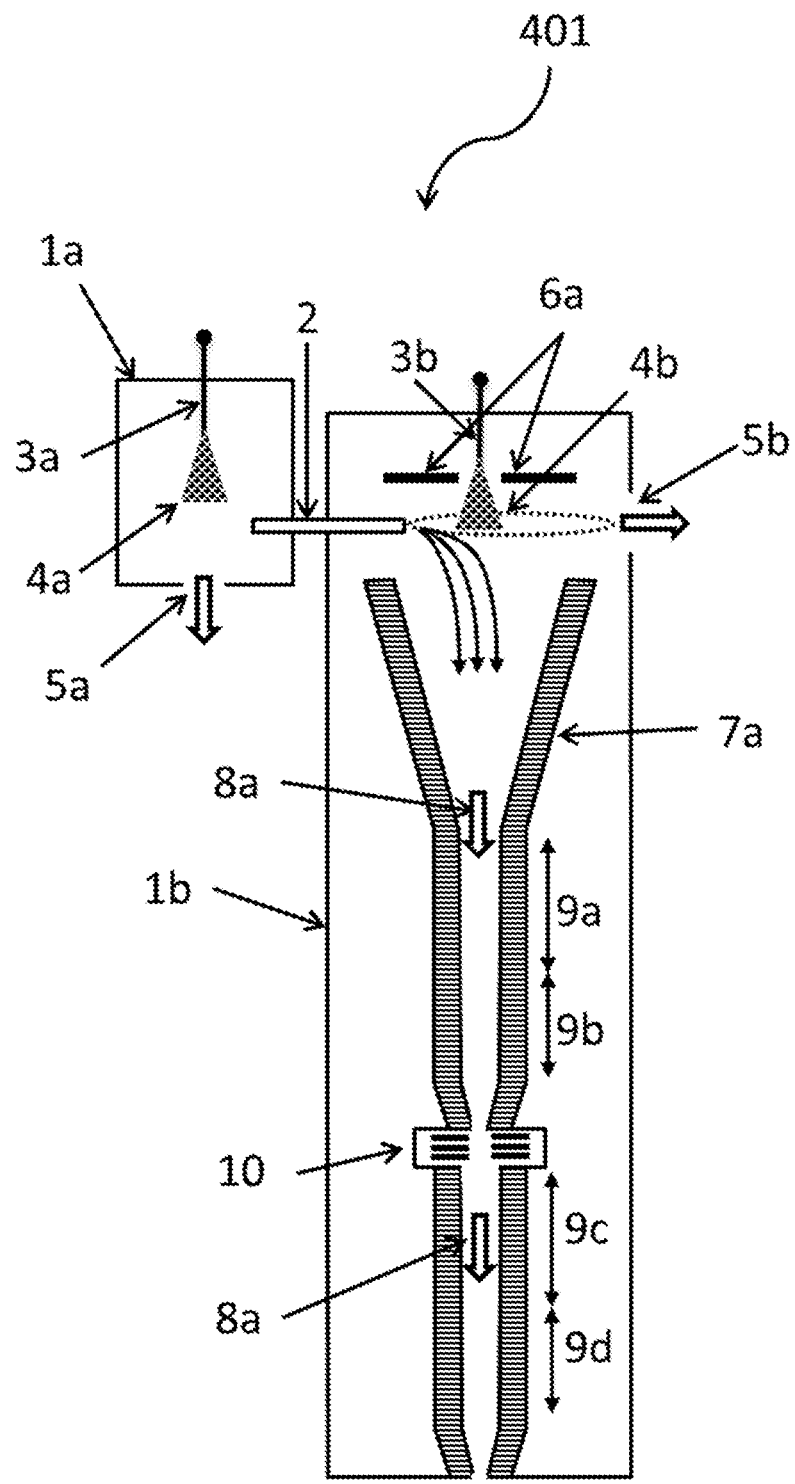

FIG. 4B shows the ion source (401) with two TIMS analyzers of the mass spectrometric system (400) in more detail.

DETAILED DESCRIPTION

While the invention is shown and described with reference to a number of different embodiments thereof, it will be recognized by those skilled in the art that combinations of embodiments and changes in form and detail may be made herein without departing from the scope of the invention as defined by the appended claims. The invention can be better understood by referring to the following figures. The elements in the figures are not necessarily to scale, emphasis instead being placed upon illustrating the principles of the invention (often schematically). The elements being identical or having equivalent function are labeled with identical reference signs in different figures.

Figure 1A:
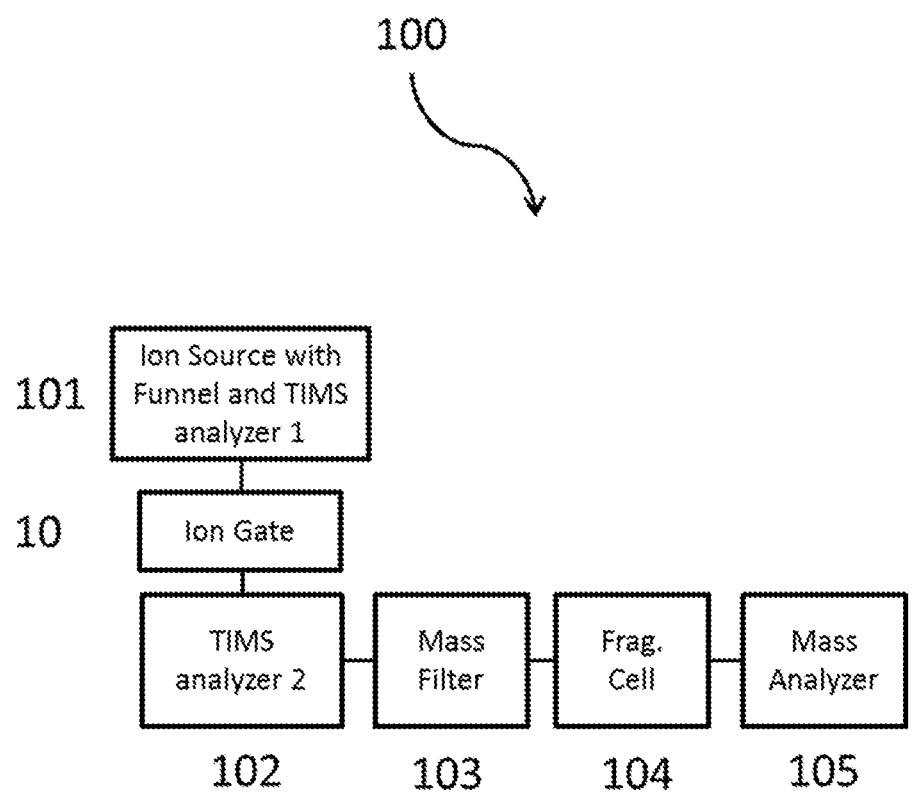
FIG. 1A shows a schematic of a first exemplary mass spectrometric system (100) comprising an ion source (101) with an RF funnel and a first TIMS analyzer, an ion gate (10), a second TIMS analyzer (102), a mass filter (103), a fragmentation cell (104) and a mass analyzer (105).

FIG. 1A shows a schematic of a first example of a mass spectrometric system according to the present invention. The mass spectrometric system (100) comprises an ion source (101) with an RF funnel and a first TIMS analyzer, an ion gate (10), a second TIMS analyzer (102), a mass filter (103), a fragmentation cell (104) and a mass analyzer (105). The mass analyzer (105) is preferably a time-of-flight analyzer with orthogonal ion injection (OTOF-MS).

Figure 1B:
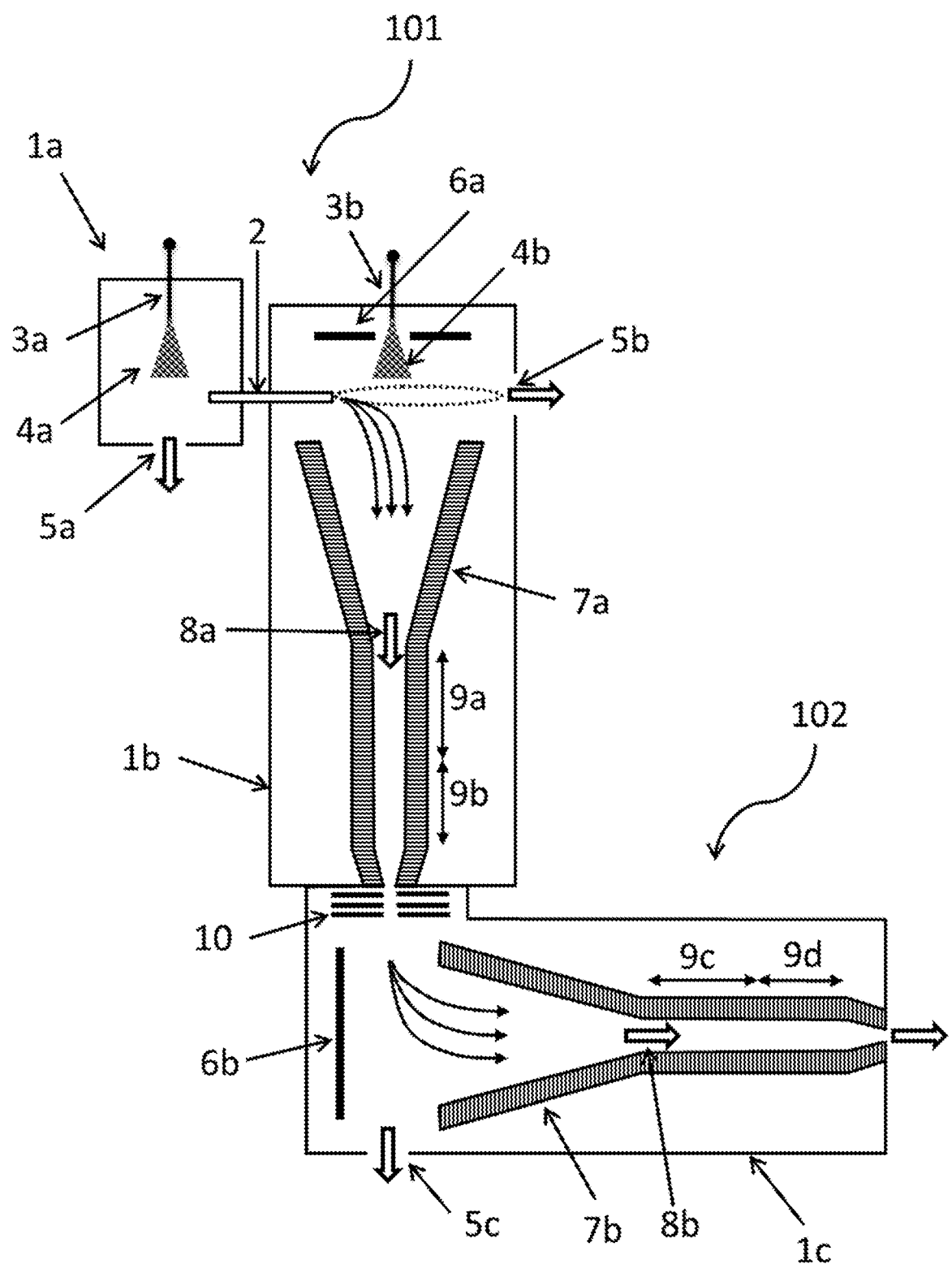
FIG. 1B shows the ion source (101) with an RF funnel and a first TIMS analyzer, the ion gate (10) and the second TIMS analyzer (102) of the mass spectrometric system (100) in more detail.

FIG. 1B shows the ion source (101) with an RF funnel and a first TIMS analyzer, the ion gate (10) and the second TIMS analyzer (102) in more detail.

The ion source (101) comprises two chambers (1a, 1b).

The chamber (1a) is held at atmospheric pressure and incorporates an electrospray ion source (spray emitter (3a), spray plume (4a)). Ions from the spray plume (4a) are introduced via a transfer capillary (2) into the first vacuum chamber (1b) and then deflected into an RF funnel (7a) by a repelling electric DC potential which is applied to a deflector electrode (6a). The transfer capillary is preferably a short wide bore capillary with an inner diameter of 1 mm or more and a length of 180 mm or less.

The vacuum chamber (1b) is held at an elevated pressure of about 2000 Pa and comprises a sub-ambient electrospray source (spray emitter (3b), spray plume (4b)). The spray emitter (3b) is positioned in an aperture of the deflector electrode (6a). Ions from the spray plume (4b) are directly introduced into the entrance of the RF funnel (7a).

The electrospray ion sources (3a, 4a) and (3b, 4b) can be operated simultaneously or separately from each other. Separation devices (not shown), like liquid chromatography devices or electrophoretic devices, can be coupled to the spray emitters (3a, 3b).

The RF funnel (7a) is an octopolar RF funnel known from published U.S. Patent Application 2004/0195503 (Park et. al). It is built as a stack of segmented apertured electrodes. Each aperture electrode comprises eight segments. The apertures of the electrodes taper to smaller diameters thus forming an inner volume in the shape of a funnel. The two phases of an RF voltage are applied alternately to adjacent segments of each single electrode and to adjacent segments of neighboring electrodes. The generated RF pseudo-potential keeps ions away from the inner wall of the RF funnel (7a).

The ions are driven by a gas flow (8a) into the first TIMS analyzer which comprises a trapping region (9a) and a separating region (9b). The gas flow (8a) is generated by pumping gas out of the vacuum chamber (1b) at the exit of the separating region (9b). The octopolar RF funnel (7a) enables a smooth transition to the RF field of the trapping region (9a). The combined length of both regions (9a) and (9b) is about 7 centimeters. The entrance portion of the trapping region (9a) is constructed as a segmented RF octopole which transitions into a segmented RF quadrupole. The separating region (9b) is constructed like the trapping region (9a) in that an upstream segmented RF octopole transitions into a downstream segmented RF quadrupole. The octopolar portions have a larger charge capacity per volume compared to the quadrupolar portion.

The first TIMS analyzer is preferably operated in a parallel accumulation mode, i.e. the first TIMS analyzer accumulates ions in the trapping region (9a) while pre-accumulated ions are analyzed in the separating region (9b) parallel in time. The gas flow (8a) drives ions exiting the RF funnel (7a) against a ramp of a counteracting electric DC field barrier of the trapping region (9a) such that the ions are axially trapped and get separated according to their mobilities at locations along the ramp. During the accumulation of ions in the trapping region (9a), the gas flow (8a) also drives ions, which have been accumulated in a prior accumulation and transferred to the separating region (9b), against a ramp of a counteracting electric DC field barrier of the separating region (9b) such that the ions get axially trapped and spatially separated according to their mobilities. After loading the separating region (9b) with ions to be analyzed, the height of the counteracting electric DC field barrier is steadily decreased such that ion species are released from the separating region (9b) in the sequence of their mobility. The velocity of the gas flow (8a) is in the order of 100 m/s and the operating pressure of the first TIMS analyzer is substantially 2000 Pa.

The second TIMS analyzer (102) comprises a quadrupolar RF funnel (7b), a trapping region (9c) and a separating region (9d). The first TIMS analyzer (9a, 9b) and the second TIMS analyzer (9c, 9d) are arranged orthogonally, i.e. a relative angle between the common axis of the regions (9a, 9b) and the common axis of the regions (9c) and (9d) is substantially 90°.

The vacuum chamber (1c) of the second TIMS analyzer (102) is held at a pressure lower than the pressure of the first vacuum chamber (1b), preferably at about 200 Pa. Ions introduced into the vacuum chamber (1c) are deflected into the quadrupolar RF funnel (7b) by a repelling electric DC potential which is applied to a deflector electrode (6b) and then guided by a gas flow (8b) towards the exit of the quadrupolar RF funnel (7b) into the trapping region (9c). The gas flow (8b) is generated by pumping gas out of the vacuum chamber (1c) at the exit of the separating region (9d). The velocity of the gas flow (8b) is in the order of 100 m/s and the operating pressure of the second TIMS (102) is substantially 200 Pa.

Like the first TIMS analyzer (9a, 9b), the second TIMS analyzer (102) is preferably operated in the parallel accumulation mode as described above, i.e. ions are accumulated in the trapping region (9c) while pre-accumulated ions are analyzed in the separating region (9d) in parallel.

Gas is pumped out of the ion source (101) and the second TIMS analyzer (102) by pumping ports (5a-5c) and through the exit of the separating region (9d), which is adjacent to the vacuum chamber of the mass filter (103) (not shown in FIG. 1B).

The ion gate (10) is an ion einzel lens. Other embodiments may comprise a Tyndall gate or a Bradbury-Nielsen gate operated with electric DC voltages wherein wires of the gate are alternately supplied with positive and negative electric DC potentials. Alternatively, the Bradbury-Nielsen gate may be operated with electric RF potentials, forming reflecting pseudo-potentials around the wires. This RF Bradbury-Nielsen gate presents the additional advantage of reflecting ions of high mobility while transmitting ions of low mobility, the limit of transmission depending on the RF frequency and voltage on the wires (gate control voltage).

The first TIMS analyzer (9a, 9b) and second TIMS analyzer (9c, 9d) can be operated in a selective transfer mode as described in U.S. Pat. No. 10,241,079 (Betz et. al), comprising the steps:
 providing ions from the atmospheric pressure ESI ion source (3a, 4a) and/or from the sub-ambient ESI ion source (3c, 4c) to the first TIMS analyzer (9a, 9b);
 separating the ions according to mobility in the first TIMS analyzer (9a, 9b) at the elevated pressure of 2000 Pa;
 applying transient electric DC potentials to the electrodes of the ion gate (10) for adjusting the transmission of the ion gate (10) and selecting ion species of interest;
 transferring the selected ions to the trapping region (9c) of a second TIMS analyzer (102);
 separating the selected ions according to mobility in the second TIMS analyzer (102); and
 analyzing the separated ions by mass spectrometry or tandem mass spectrometry using the downstream mass analyzer (105) and optionally the downstream mass filter (103) and fragmentation cell (104).

Preferably, the ion gate (10) is operated by adjusting the transmission of the ion gate such that the transmission for ions in at least one limited mobility range is reduced. Preferably, the ion gate (10) is operated such that unwanted ion species are eliminated or at least substantially reduced and that the transmission for highly abundant ion species of interest is lower than the transmission of less abundant ion species of interest.

Preferably, the steps of separating in the first TIMS analyzer (9a, 9b) and selecting are repeated and the transferred ions are accumulated in the trapping region (9c) of the second TIMS analyzer (102) prior to transferring them to, and separating them in, the separating region (9d).

The first (9a, 9b) and second (9c, 9d) TIMS analyzer can be also operated in a tandem IMS mode, comprising the steps:
 providing ions from the atmospheric pressure ESI ion source (3a, 4a) and/or from the sub-ambient ESI ion source (3b, 4b) to the first TIMS analyzer (9a, 9b);
 separating the ions according to mobility in the first TIMS analyzer (9a, 9b) at the elevated pressure of 2000 Pa;
 applying transient electric DC potentials to the electrodes of the ion gate (10) for adjusting the transmission of the ion gate (10) and selecting one ion species of interest;
 fragmenting the selected ions by accelerating the selected ions into the vacuum chamber (1c) using electric DC potentials applied to the electrodes of the ion gate (10);
 transferring the fragment ions to the trapping region (9c) of a second TIMS analyzer (102);
 separating the fragment ions according to mobility in the second TIMS analyzer (102); and
 analyzing the separated fragment ions by mass spectrometry or tandem mass spectrometry using the downstream mass analyzer (105) and optionally the downstream mass filter (103) and fragmentation cell (104).

Preferably, the steps of separating in the first TIMS analyzer (9a, 9b), selecting, fragmenting or activating, and transferring the fragmented or activated ions, are repeated multiple times before the resultant accumulated ions in the trapping region (9c) of the second TIMS analyzer (102) are transferred to, and separated in, the separating region (9d).

The repetition rate of separations in the second TIMS analyzer (9c, 9d) is preferably between 10 Hz and 100 Hz at an averaged mobility resolution R between about 75 and 40, respectively. The first TIMS analyzer (9a, 9b) is operated at a pressure which is a factor of 10 higher than the operating pressure of the second TIMS analyzer (9c, 9d), and can, for example, be operated at a repetition rate which is a factor of 5 higher than the repetition rate of the second TIMS analyzer (9c, 9d), such that the mobility resolution of the first TIMS analyzer is still a factor of about 3.8 ($=10^{3/4} \cdot 5^{-1/4}$) higher. The operation at the elevated pressure results in a better selectivity and ion throughput.

Figure 2A:
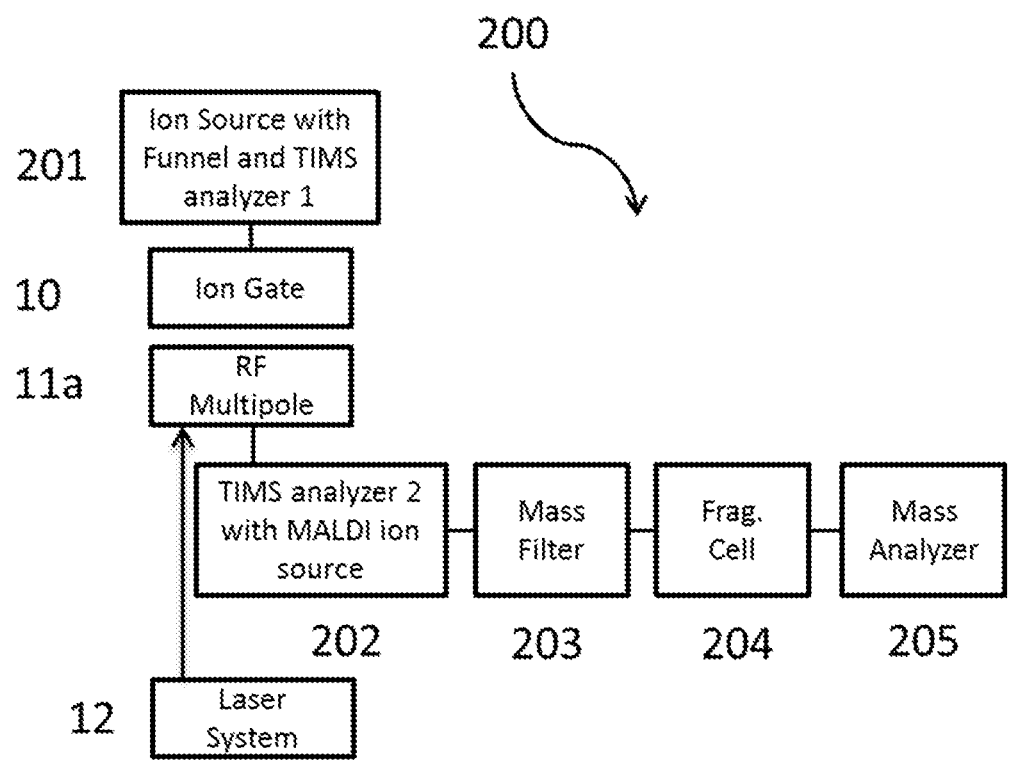
FIG. 2A shows a schematic of a second exemplary mass spectrometric system (200) comprising an ion source (201) with an RF funnel and a first TIMS analyzer, an ion gate (10), a RF quadrupole (11a), a laser system (12), a second TIMS analyzer (202), a mass filter (203), a fragmentation cell (204) and a mass analyzer (205).

FIG. 2A shows a schematic of a second example of a mass spectrometric system according to the present invention. The mass spectrometric system (200) comprises an ion source (201) with an RF funnel and a first TIMS analyzer, an ion gate (10), a RF quadrupole (11a), a laser system (12), a second TIMS analyzer (202), a mass filter (203), a fragmentation cell (204) and a mass analyzer (205). The mass analyzer (205) is preferably a time-of-flight analyzer with orthogonal ion injection (OTOF-MS).

Figure 2B:
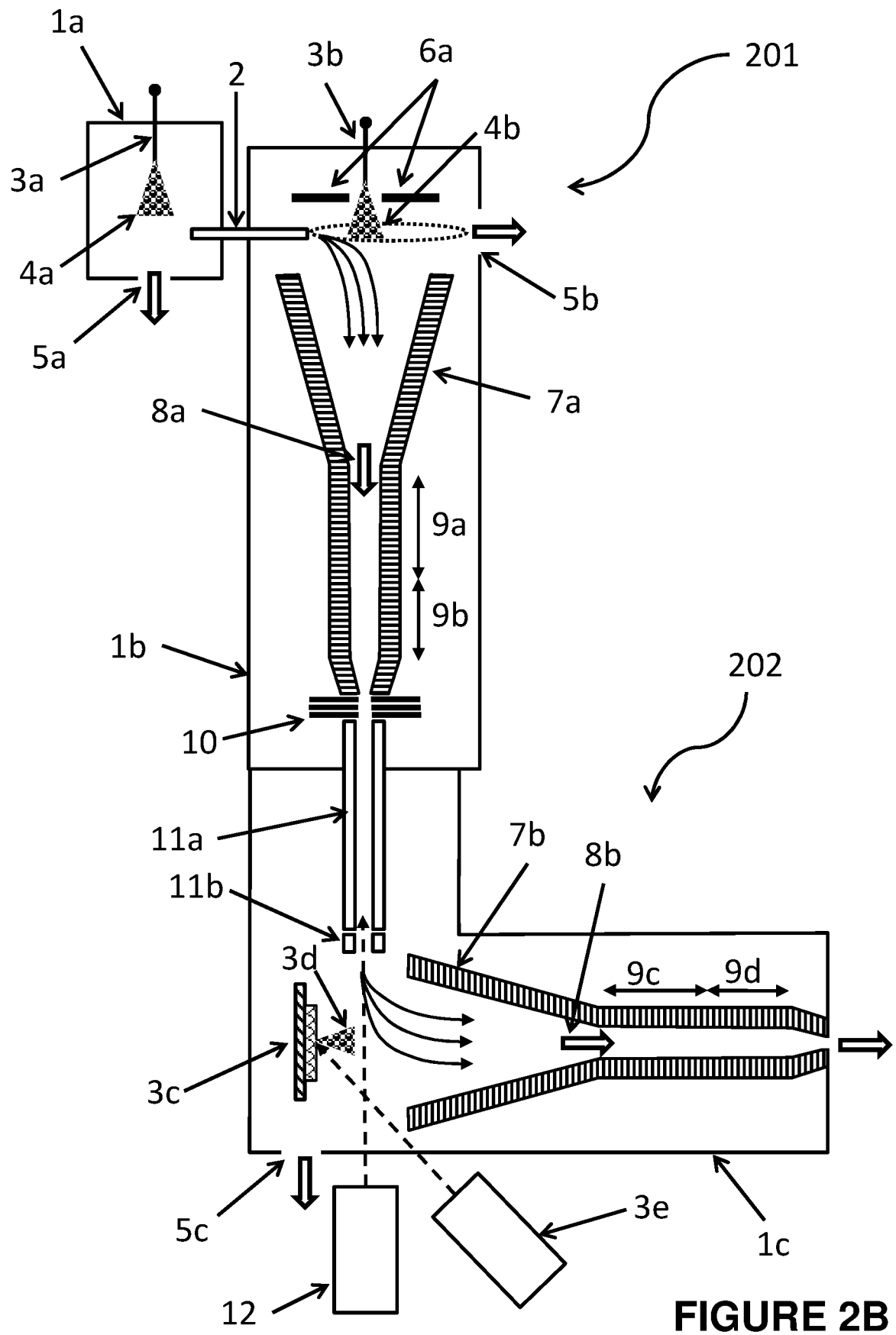
FIG. 2B shows the ion source (201) with an RF funnel and a first TIMS analyzer, the ion gate (10), the RF quadrupole (11a), the laser system (12) and the second TIMS analyzer (202) of the mass spectrometric system (200) in more detail.

FIG. 2B shows the ion source (201) with an RF funnel and a first TIMS analyzer, the ion gate (10), the RF quadrupole (11a), the laser system (12) and the TIMS analyzer (202) in more detail.

The mass spectrometric system (200) differs from the mass spectrometric system (100) in that:
 the ion gate (10) is located in the first vacuum chamber (1b);
 an RF quadrupole (11a) bridges the vacuum chambers (1b) and (1c);
 an additional sub-ambient MALDI source is located in the vacuum chamber (1c); and
 a laser system (12) for generating and introducing photons into the RF quadrupole (11a).

Like in the mass spectrometric system (100), the ion gate (10) can be operated in a selective transfer mode or tandem IMS mode. In the selective transfer, transient electric DC potentials are applied to the electrodes of the ion gate (10) for adjusting the transmission of ions which have been separated according to mobility in the separating region (9b) of the first TIMS analyzer. In the tandem IMS mode, transient electric DC potentials are applied to the electrodes of the ion gate (10) such that one ion species of interest is selected and fragmented by accelerating the selected ions into the RF quadrupole (11a) using electric DC potentials applied to the electrodes of the ion gate (10).

The RF quadrupole (11a) can be operated as a fragmentation cell using CID or photo dissociation (PD), e.g. in the tandem TIMS mode, as an activation cell using collisional-induced activation (CIA) or photon-induced activation (PA), or as a combined mass-mobility filter. By applying appropriate electric DC potentials to the exit electrodes (11b), ions introduced from the first TIMS analyzer (9a, 9b) can be trapped inside the RF quadrupole (11a).

The MALDI source comprises a MALDI plate (3c) and a MALDI laser (3e), which generates a MALDI plume 3d when directed at a sample. Ions introduced via the RF quadrupole (11a) into the vacuum chamber (1c) are deflected into the entrance of the RF funnel (7b) by a repelling electric DC potential which is applied to the MALDI plate (3c) or a replacement electrode (not shown). Ions from the MALDI plume 3d are introduced directly into the entrance of the RF funnel (7b).

The laser system (12) can generate photons in at least one of the vacuum-ultraviolet range (VUV), ultraviolet range (UV) and infrared (IR) range. The photons can be used for single photon induced dissociation (PD), for example by VUVPD or UVPD, or for infrared multi-photon induced dissociation (IRMPD) or for infrared multi-photon activation (IRMPA). Optionally, the MALDI laser (3e) and the laser system (12) might be a single multiple wavelength laser system, for example a diode pumped solid state Nd:YAG laser system. The fundamental of the Nd:YAG laser system at a wavelength of 1064 nm or the pump light produced by laser emitting diodes can be used for IRMPD or IRMPA, the third harmonic at a wavelength 355 nm can be used as a light source for the sub-ambient MALDI source (3c, 3e), and the fourth harmonics at a wavelength 266 nm can be used for UVPD and, optionally for post-ionization of the MALDI process.

The trapping of ions inside the RF quadrupole (11a) can, for example, be necessary in case the photon-induced activation or fragmentation is not fast enough to induce the fragmentation or activation during the time that would otherwise (i.e. without trapping) be required for the ions to traverse the RF quadrupole (11a). The time needed to induce fragmentation depends on the absorption cross section of the ions and photon density in the RF quadrupole (11a).

Figure 3A:
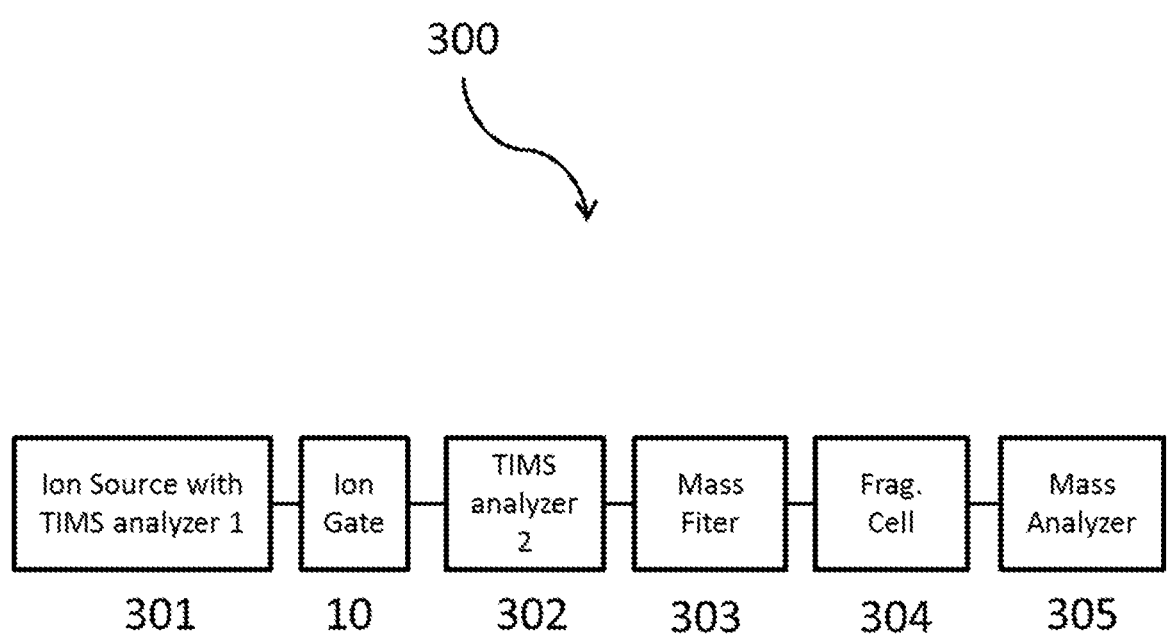
FIG. 3A shows a schematic of a third exemplary mass spectrometric system (300) comprising an ion source (301) with a first TIMS analyzer, an ion gate (10), a second TIMS analyzer (302), a mass filter (303), a fragmentation cell (304) and a mass analyzer (305).

The mass spectrometric system (200) enables a plurality of operational modes of hybrid IMS/MS analysis:
MS (without IMS separation)
Tandem MS (without IMS separation)
IMS separation/(tandem) MS
IMS separation with selection/IMS separation/(tandem) MS
IMS separation with selection/mass-mobility filtering/IMS separation/(tandem) MS
tandem IMS with fragmentation by CID or PD/(tandem) MS
tandem IMS with fragmentation by CID or PD and mass-mobility filtering/(tandem) MS FIG. 3A shows a schematic of a third example of a mass spectrometric system according to the present invention. The mass spectrometric system (300) comprises an ion source (301) with a first TIMS analyzer, an ion gate (10), a second TIMS analyzer (302), a mass filter (303), a fragmentation cell (304) and a mass analyzer (305). The mass analyzer (305) is preferably a time-of-flight analyzer with orthogonal ion injection (OTOF-MS).

Figure 3B:
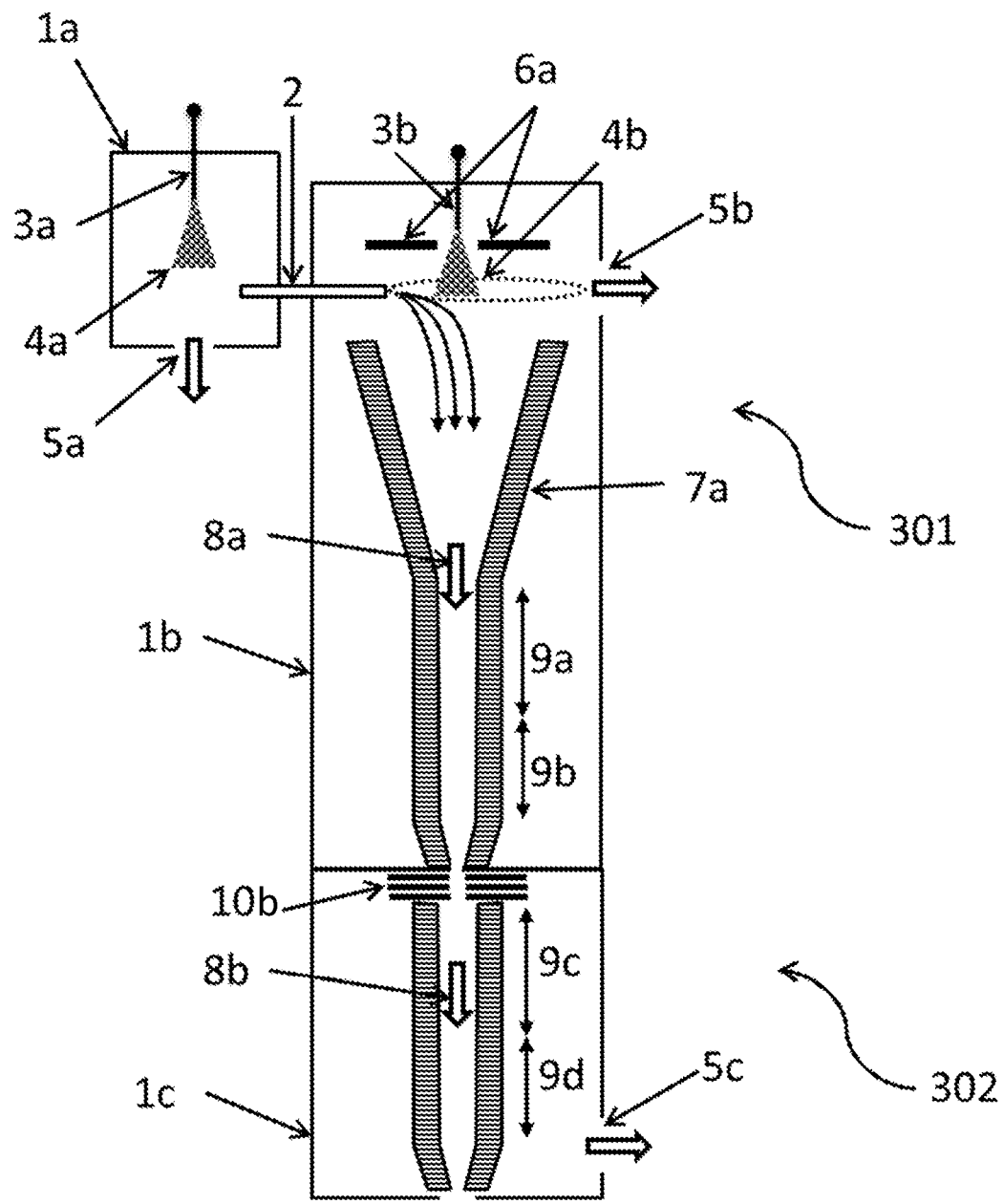
FIG. 3B shows the ion source (301) with a first TIMS analyzer, the ion gate (10) and the second TIMS analyzer (302) of the mass spectrometric system (300) in more detail.

FIG. 3B shows the ion source (301) with a first TIMS analyzer, the ion gate (10) and the second TIMS analyzer (302) in more detail.

The ion source (301) comprises two chambers (1a, 1b).

The chamber (1a) is held at atmospheric pressure and incorporates an electrospray ion source (spray emitter (3a), spray plume (4a)). Ions from the spray plume (4a) are introduced via a transfer capillary (2) into the first vacuum chamber (1b) and then deflected into an RF funnel (7a) by a repelling electric DC potential which is applied to a deflector electrode (6a). The transfer capillary is preferably a short wide bore capillary with an inner diameter of 1 mm or more and a length of 180 mm or less.

The vacuum chamber (1b) is held at an elevated pressure of about 3000 Pa and comprises a sub-ambient electrospray source (spray emitter (3b), spray plume (4b)). The spray emitter (3b) is positioned in an aperture of the deflector electrode (6a). Ions from the spray plume (4b) are directly introduced into the entrance of the RF funnel (7a).

The electrospray ion sources (3a, 4a) and (3b, 4b) can be operated simultaneously or separately from each other. Separation devices (not shown), like liquid chromatography devices or electrophoretic devices, can be coupled to the spray emitters (3a, 3b).

The RF funnel (7a) is an octopolar RF funnel known from published U.S. Patent Application 2004/0195503 (Kim et. al). It is built as a stack of segmented apertured electrodes. Each apertured electrode comprises eight segments. The apertures of the electrodes taper to smaller diameters thus forming an inner volume in the shape of a funnel. The two phases of an RF voltage are applied alternately to adjacent segments of each single electrode and to adjacent segments of neighboring electrodes. The generated RF pseudo-potential keeps ions away from the inner wall of the RF funnel (7a).

The ions are driven by a gas flow (8a) into the first TIMS analyzer which comprises a trapping region (9a) and a separating region (9b). The gas flow (8a) is generated by pumping gas out of the vacuum chamber (1b) at the exit of the separating region (9b). The octopolar RF funnel (7a) enables a smooth transition to the RF field of the trapping region (9a). The combined length of both regions (9a) and (9b) is about 10 centimeters. The entrance portion of the trapping region (9a) is constructed as a segmented RF octopole which transitions into a segmented RF quadrupole. The separating region (9b) is constructed like the trapping region (9a) in that an upstream segmented RF octopole transitions into a downstream segmented RF quadrupole. The octopolar portions have a larger space capacity per volume compared to the quadrupolar portion.

The first TIMS analyzer is preferably operated in a parallel accumulation mode, i.e. the first TIMS analyzer accumulates ions in the trapping region (9a) while pre-accumulated ions are analyzed in the separating region (9b) parallel in time. The gas flow (8a) drives ions exiting the RF funnel (7a) against a ramp of a counteracting electric DC field barrier of the trapping region (9a) such that the ions are axially trapped and get separated according to their mobilities at locations along the ramp. During the accumulation of ions in the trapping region (9a), the gas flow (8a) also drives ions, which have been accumulated in a prior accumulation and transferred to the separating region (9b), against a ramp of a counteracting electric DC field barrier of the separating region (9b) such that the ions get axially trapped and spatially separated according to their mobilities. After loading the separating region (9b) with ions to be analyzed, the height of the counteracting electric DC field barrier is steadily decreased such that ion species are released from the separating region (9b) in the sequence of their mobility. The velocity of the gas flow (8a) is in the order of 100 m/s and the operating pressure of the first TIMS analyzer is substantially 3000 Pa.

The second TIMS analyzer (302) comprises a trapping region (9c) and a separating region (9d). Ions are directly introduced from the exit of the separating region (9b) of the first TIMS analyzer into the trapping region (9c) of the second TIMS analyzer (302). The first TIMS analyzer (9a, 9b) and the second TIMS analyzer (9c, 9d) are arranged collinearly, i.e. a relative angle between the common axis of the regions (9a, 9b) and the common axis of the regions (9c) and (9d) is zero. Like the first TIMS analyzer (9a, 9b), the second TIMS analyzer (302) is preferably operated in the parallel accumulation mode as described above, i.e. ions are accumulated in the trapping region (9c) while pre-accumulated ions are analyzed in the separating region (9d) in parallel.

The vacuum chamber (1c) of the second TIMS analyzer (302) is held at a pressure lower than the pressure of the first vacuum chamber (1b), preferably at about 150 Pa. The gas flow (8b) is generated by pumping gas away from the vacuum chamber (1c) at the exit of the separating region (9d). The velocity of the gas flow (8b) is in the order of 100 m/s.

The ion gate (10) is an ion einzel lens. Other embodiments may comprise a Tyndall gate or a Bradbury-Nielsen gate. The first TIMS analyzer (9a, 9b) and second TIMS analyzer (9c, 9d) can be operated in a selective transfer mode as described in U.S. Pat. No. 10,241,079 (Betz et. al), comprising the steps:
  providing ions from the atmospheric pressure ESI ion source (3a, 4a) and/or from the sub-ambient ESI ion source (3b, 4b) to the first TIMS analyzer (9a, 9b);
  separating the ions according to mobility in the first TIMS analyzer (9a, 9b) at the elevated pressure of 3000 Pa;
  applying transient electric DC potentials to the electrodes of the ion gate (10) for adjusting the transmission of the ion gate (10) and selecting ion species of interest;
  transferring the selected ions to the trapping region (9c) of a second TIMS analyzer (302);
  separating the selected ions according to mobility in the second TIMS analyzer (302); and
  analyzing the separated ions by mass spectrometry or tandem mass spectrometry using the downstream mass analyzer (305) and optionally the downstream mass filter (303) and fragmentation cell (304).

Preferably, the ion gate (10) is operated by adjusting the transmission of the ion gate such that the transmission for ions in at least one limited mobility range is reduced, preferably such that unwanted ion species are eliminated or at least substantially reduced and that the transmission for highly abundant ion species of interest is lower than the transmission of less abundant ion species of interest.

Preferably, the steps of separating in the first TIMS analyzer (9a, 9b), selecting, and transferring ions are repeated multiple times before the resulting accumulated ions in the trapping region (9c) of the second TIMS analyzer (302) are transferred to and separated in the separating region (9d).

The first (9a, 9b) and second (9c, 9d) TIMS analyzer can be also operated in a tandem IMS mode, comprising the steps:
  providing ions from the atmospheric pressure ESI ion source (3a, 4a) and/or from the sub-ambient ESI ion source (3b, 4b) to the first TIMS analyzer (9a, 9b);
  separating the ions according to mobility in the first TIMS analyzer (9a, 9b) at the elevated pressure of 3000 Pa;
  applying transient electric DC potentials to the electrodes of the ion gate (10) for adjusting the transmission of the ion gate (10) and selecting one ion species of interest;
  fragmenting the selected ions by accelerating the selected ions into the vacuum chamber (1c) using electric DC potentials applied to the electrodes of the ion gate (10);
  transferring the fragment ions to the trapping region (9c) of a second TIMS analyzer (302);
  separating the fragment ions according to mobility in the second TIMS analyzer (302); and
  analyzing the separated fragment ions by mass spectrometry or tandem mass spectrometry using the downstream mass analyzer (305) and optionally the downstream mass filter (303) and fragmentation cell (304).

Preferably, the steps of separating in the first TIMS analyzer (9a, 9b), selecting and fragmenting or activating are repeated and the transferred fragment ions or activated ions are accumulated in the trapping region (9c) of the second TIMS analyzer (302) prior to transferring them to, and separating them in, the separating region (9d).

The repetition rate of separations in the second TIMS analyzer (9c, 9d) can, for example, be about 50 Hz and an averaged mobility resolution R of 60. The first TIMS analyzer (9a, 9b) is operated at a pressure which is a factor of 20 higher than the operating pressure of the second TIMS analyzer (9c, 9d), and can, for example, be operated at a repetition rate which is a factor 10 higher than the repetition rate of the second TIMS analyzer (9c, 9d) such that the mobility resolution of the first TIMS analyzer is still a factor of about 5.3 ($=20^{3/4} \cdot 10^{-1/4}$) higher. The operation at the elevated pressure results in a better selectivity and ion throughput.

FIG. 4A shows a schematic of a fourth example of a mass spectrometric system according to the present invention. The mass spectrometric system (400) comprises an ion source (401) with two TIMS analyzers, a mass filter (403), a fragmentation cell (404) and a mass analyzer (405). The mass analyzer (405) is preferably a time-of-flight analyzer with orthogonal ion injection (OTOF-MS).

FIG. 4B shows the ion source (401) with two TIMS analyzers and an ion gate (10b).

The ion source (401) comprises two chambers (1a, 1b). The chamber (1a) is held at atmospheric pressure and incorporates an electrospray ion source (spray emitter (3a), spray plume (4a)). Ions from the spray plume (4a) are introduced via a transfer capillary (2) into the first vacuum chamber (1b) and then deflected into an RF funnel (7a) by a repelling electric DC potential which is applied to a deflector electrode (6a). The transfer capillary is preferably a short wide bore capillary with an inner diameter of 1 mm or more and a length of 180 mm or less. The vacuum chamber (1b) is held at an elevated pressure of about 2000 Pa and comprises a sub-ambient electrospray source (spray emitter (3b), spray plume (4b)). The spray emitter (3b) is positioned in an aperture of the deflector electrode (6a). Ions from the spray plume (4b) are directly introduced into the entrance of the RF funnel (7a). The electrospray ion sources (3a, 4a) and (3b, 4b) can be operated simultaneously or separately from each other. Separation devices (not shown), like liquid chromatography devices or electrophoretic devices, can be coupled to the spray emitters (3a, 3b).

The RF funnel (7a) is a quadrupole RF funnel known from published U.S. Patent Application 2004/0195503 (Kim et. al). It is built as a stack of segmented apertured electrodes. Each apertured electrode comprises four segments. The apertures of the electrodes taper to smaller diameters thus forming an inner volume in the shape of a funnel. The two phases of an RF voltage are applied alternately to adjacent segments of each single electrode and to adjacent segments of neighboring electrodes. The generated RF pseudo-potential keeps ions away from the inner wall of the RF funnel (7a).

The first TIMS analyzer (9a, 9b) and the second TIMS analyzer (9c, 9d) are located in the same vacuum chamber (1b). Each TIMS analyzer comprises a trapping region (9a, 9c) and a separating region (9b, 9d). The first TIMS analyzer (9a, 9b) and the second TIMS analyzer (9c, 9d) are arranged collinearly, i.e. a relative angle between the common axis of the regions (9a, 9b) and the common axis of the regions (9c) and (9d) is substantially zero.

The ions are driven by a gas flow (8a) into the trapping region (9a) of the first TIMS analyzer. The gas flow (8a) is generated by pumping gas away from the vacuum chamber (1b) at the exit of the separating region (9d) of the second TIMS analyzer. The quadrupolar RF funnel (7a) enables a smooth transition to the RF field of the trapping region (9a). The combined length of both regions (9a) and (9b) is about 7 centimeters. The trapping regions (9a, 9c) and the separating regions (9b, 9d) are constructed as segmented RF quadrupoles.

Both TIMS analyzers are preferably operated in a parallel accumulation mode, i.e. the TIMS analyzer accumulates ions in the trapping region (9a, 9c) while pre-accumulated ions are analyzed in the separating region (9b, 9d) parallel in time. The gas flow (8a) drives ions against a ramp of a counteracting electric DC field barrier of the trapping region (9a, 9c) such that the ions are axially trapped and get separated according to their mobilities at locations along the ramp. During the accumulation of ions in the trapping region (9a, 9c), the gas flow (8a) also drives ions, which have been accumulated in a prior accumulation and transferred to the separating region (9b, 9d), against a ramp of a counteracting electric DC field barrier of the separating region (9b, 9d) such that the ions get axially trapped and spatially separated according to their mobilities. After loading the separating region (9b, 9d) with ions to be analyzed, the height of the counteracting electric DC field barrier is steadily decreased such that ion species are released from the separating region (9b) in the sequence of their mobility. The velocity of the gas flow (8a) is in the order of 100 m/s and the operating pressure of both TIMS analyzers is substantially 2000 Pa.

The ion gate (10b) is an ion einzel lens. It is located between the separating region (9b) and the trapping region (9c) and enclosed such that the gas flow (8a) can transit both TIMS analyzers. The first TIMS analyzer (9a, 9b) and second TIMS analyzer (9c, 9d) can be operated in a selective transfer mode as described in U.S. Pat. No. 10,241,079 (Betz et. al). Preferably, the ion gate (10b) is operated by adjusting the transmission of the ion gate (10b) such that the transmission for ions in at least one limited mobility range is reduced, preferably such that unwanted ion species are eliminated or at least substantially reduced.

The repetition rate of separations of both TIMS analyzer can for example be 100 Hz at an averaged mobility resolution R above 200. The operation at the elevated pressure results in a high mobility resolution and ion throughput. The repetition rate of separations of the first TIMS analyzer (9a, 9b) can for example be 200 Hz at an averaged mobility resolution of about 170 and while selected ions with a reduced amount of charge, e.g. from a limited mobility range, are selected and analyzed in the second TIMS analyzer (9c, 9d) at a repetition rate of only 10 Hz, but at a mobility resolution of 420.

The invention claimed is:

1. A mass spectrometric system comprising an ion source, a first trapped ion mobility spectrometry (TIMS) analyzer in which ions are radially confined by an electric RF field, and a mass analyzer, wherein the TIMS analyzer is located and operated in a first vacuum chamber at an elevated pressure at or above 1000 Pa.

2. The mass spectrometric system according to claim 1, further comprising an ion gate and a second TIMS analyzer wherein the second TIMS analyzer is located downstream of the first TIMS analyzer and the ion gate is located between the first TIMS analyzer and the second TIMS analyzer.

3. The mass spectrometric system according to claim 2, wherein the second TIMS analyzer is located in a second vacuum chamber.

4. The mass spectrometric system according to claim 3, wherein the pressure in the second vacuum chamber is lower than the pressure in the first vacuum chamber.

5. The mass spectrometric system according to claim 2, further comprising an RF multipole located between the first and second TIMS analyzers.

6. The mass spectrometric system according to claim 5, wherein the RF multipole is operated as one of a mass filter, a mobility-mass filter, an ion guide, a fragmentation cell, an activation cell and an ion trap.

7. The mass spectrometric system according to claim 2, wherein the first TIMS analyzer is arranged collinearly to the second TIMS analyzer.

8. The mass spectrometric system according to claim 2, wherein the first TIMS analyzer is arranged non-collinearly to the second TIMS analyzer.

9. The mass spectrometric system according to claim 8, wherein the first and/or the second TIMS analyzer comprises an RF funnel at the entrance.

10. The mass spectrometric system according to claim 2, wherein the first and/or the second TIMS analyzer comprises an accumulation region for trapping and a mobility separation region for separating ions according to mobility.

11. A method for analyzing ions, comprising the steps of:
providing ions from an ion source to a first TIMS analyzer in which ions are radially confined by an electric RF field;
separating the ions according to mobility in the first TIMS analyzer at an elevated pressure at or above 1000 Pa;
selecting at least one ion species of interest;
transferring the selected ions of interest to a trapping region of a second TIMS analyzer;
separating the selected ions of interest according to mobility in the second TIMS analyzer; and
analyzing the separated ions by mass spectrometry or tandem mass spectrometry.

12. The method according to claim 11, wherein selecting at least one ion species of interest and transferring the selected ions to the second TIMS analyzer comprises reducing the number of transferred ions in at least one limited mobility range.

13. The method according to claim 12, wherein a number of ions transferred for highly abundant ion species of interest is lower than a number of ions transferred for less abundant ion species of interest.

14. The method according to claim 11, wherein the selected ions of interest are separated in the second TIMS analyzer at a pressure below 500 Pa.

15. The method according to claim 11, wherein the steps of separating in the first TIMS analyzer and selecting are repeated and the transferred ions of interest are accumulated in the trapping region of the second TIMS analyzer prior to separating them in the second TIMS analyzer.

16. The method according to claim 15, wherein the selected ions of interest are separated in the second TIMS analyzer at a pressure below 500 Pa.

17. The method according to claim 16, wherein a repetition rate of separations in the first TIMS analyzer is at least twice a repetition rate of separations in the second TIMS analyzer.

18. The method according to claim 17, wherein an average mobility resolution of the first TIMS analyzer is substantially equal to or higher than an average mobility resolution of the second TIMS.

19. The method according to claim 11, wherein the selected ions of interest are filtered according to mass or according to a combination of mass and mobility prior to being trapped in the trapping region of the second TIMS analyzer.

20. A method for analyzing ions, comprising the steps of:
providing ions from an ion source to a first TIMS analyzer in which ions are radially confined by an electric RF field;
separating the ions according to mobility in the first TIMS analyzer at an elevated pressure at or above 1000 Pa;
selecting one ion species of interest from a limited mobility range;
fragmenting or activating the selected ions of interest;
transferring the fragment ions or activated ions to a trapping region of a second TIMS analyzer;
separating the fragment ions or activated ions according to mobility in the second TIMS analyzer; and
analyzing the separated ions by mass spectrometry or tandem mass spectrometry.

21. The method according to claim 20, wherein the fragment ions or activated ions are separated in the second TIMS analyzer at a pressure below 500 Pa.

22. The method according to claim 20, wherein the steps of separating in the first TIMS analyzer, selecting and fragmenting or activating are repeated and the transferred fragment ions or activated ions are accumulated in the trapping region of the second TIMS analyzer prior to separating them in the second TIMS analyzer.

23. The method according to claim 22, wherein a repetition rate of separations in the first TIMS analyzer is at least twice a repetition rate of separations in the second TIMS analyzer.

24. The method according to claim 23, wherein an average mobility resolution of the first TIMS analyzer is substantially equal to or higher than an average mobility resolution of the second TIMS.

25. The method according to claim 20, wherein the selected ions of interest are filtered according to mass or according to a combination of mass and mobility prior to being trapped in the trapping region of the second TIMS analyzer.

26. The mass spectrometric system according to claim 1, wherein the ion source is a sub-ambient pressure electrospray ion source and located in the first vacuum chamber.

27. The mass spectrometric system according to claim 1, wherein the ion source is an atmospheric pressure electrospray ion source and located in a chamber which is coupled via a transfer capillary with the first vacuum chamber, said transfer capillary being a short wide bore capillary with an inner diameter of 1 mm or more and a length of 180 mm or less.

28. The mass spectrometric system according to claim 1, wherein the TIMS analyzer is located and operated in the first vacuum chamber at an elevated pressure at or above 1500 Pa.

29. The mass spectrometric system according to claim 4, wherein the pressure in the second vacuum chamber is below 500 Pa.

30. The mass spectrometric system according to claim 4, wherein the pressure in the second vacuum chamber is lower by a factor of two.

31. The mass spectrometric system according to claim 11, wherein the selected ions of interest are separated in the second TIMS analyzer at a pressure which is a factor of two lower than the pressure in the first TIMS.

32. The mass spectrometric system according to claim 20, wherein the fragment ions or activated ions are separated in the second TIMS analyzer at a pressure which is a factor of two lower than the pressure in the first TIMS.

* * * * *